(12) United States Patent
Tsuchizawa

(10) Patent No.: US 10,377,443 B2
(45) Date of Patent: Aug. 13, 2019

(54) BICYCLE CONTROL APPARATUS

(71) Applicant: Shimano Inc., Sakai, Osaka (JP)

(72) Inventor: Yasuhiro Tsuchizawa, Osaka (JP)

(73) Assignee: Shimano Inc., Osaka (JP)

(*) Notice: Subject to any disclaimer, the term of this patent is extended or adjusted under 35 U.S.C. 154(b) by 260 days.

(21) Appl. No.: 15/667,952

(22) Filed: Aug. 3, 2017

(65) Prior Publication Data

US 2017/0327182 A1 Nov. 16, 2017

Related U.S. Application Data

(62) Division of application No. 14/446,864, filed on Jul. 30, 2014, now Pat. No. 9,751,589.

(30) Foreign Application Priority Data

Oct. 29, 2013 (JP) ................. 2013-224122

(51) Int. Cl.
| | |
|---|---|
| *B62M 6/45* | (2010.01) |
| *B62M 7/04* | (2006.01) |
| *B62M 25/04* | (2006.01) |
| *B62M 6/50* | (2010.01) |
| *B62M 6/55* | (2010.01) |
| *B62M 3/00* | (2006.01) |

(52) U.S. Cl.
CPC ............ *B62M 6/45* (2013.01); *B62M 6/50* (2013.01); *B62M 6/55* (2013.01); *B62M 7/04* (2013.01); *B62M 25/04* (2013.01); *B62M 2003/006* (2013.01)

(58) Field of Classification Search
CPC . B62M 6/45; B62M 6/50; B62M 6/55; B62M 7/04; B62M 25/04; B62M 2003/006
See application file for complete search history.

(56) References Cited

U.S. PATENT DOCUMENTS

| | | | |
|---|---|---|---|
| 5,937,962 | A | 8/1999 | Yokoyama |
| 8,892,279 | B2 | 11/2014 | Aoki et al. |
| 2012/0083957 | A1 | 4/2012 | Aoki et al. |

FOREIGN PATENT DOCUMENTS

| | | |
|---|---|---|
| CN | 1373057 A | 10/2002 |
| DE | 102010017412 A1 | 12/2011 |
| DE | 102013216723 A1 | 2/2015 |
| JP | 10-59262 A | 3/1998 |
| JP | 11-59558 A | 3/1999 |

(Continued)

*Primary Examiner* — Jerrah Edwards
(74) *Attorney, Agent, or Firm* — Global IP Counselors, LLP

(57) ABSTRACT

A bicycle control apparatus is basically provided for controlling a bicycle having a drive assistance electric motor. The bicycle control apparatus includes a manual drive force detector, a shift state detector and a controller. The manual drive force detector detects a manual drive force. The shift state detector detects a shift state of the bicycle. The controller issues a command for controlling a drive assistance force to be outputted by the drive assistance electric motor in accordance with the manual drive force detected by the manual drive force detector. The controller controls the drive assistance force to delay a reduction in the drive assistance force in relation to a reduction in the manual drive force upon determining the manual drive force is reduced, and controls the delay in the reduction of the drive assistance force in accordance with the shift state of the bicycle.

11 Claims, 15 Drawing Sheets

(56) References Cited

FOREIGN PATENT DOCUMENTS

| | | |
|---|---|---|
| JP | 2001-10581 A | 1/2001 |
| JP | 2001-122184 A | 5/2001 |
| JP | 2002-356191 A | 12/2002 |
| JP | 3530252 B2 | 3/2004 |
| JP | 2004-314753 A | 11/2004 |
| JP | 2004-322809 A | 11/2004 |
| JP | 3655350 B2 | 3/2005 |

BICYCLE CONTROL APPARATUS

CROSS-REFERENCE TO RELATED APPLICATIONS

This application is a divisional application of U.S. patent application Ser. No. 14/446,864 filed on Jul. 30, 2014, which claims priority under 35 U.S.C. §119 to Japanese Patent Application No. 2013-224122, filed Oct. 29, 2013. The entire disclosures of Japanese Patent Application No. 2013-224122 and U.S. patent application Ser. No. 14/446,864 are hereby incorporated herein by reference.

BACKGROUND

Field of the Invention

This invention generally relates to a bicycle control apparatus. More specifically, the present invention relates to a bicycle control apparatus for controlling a drive assistance electric motor of a bicycle.

Background Information

Bicycles with electric motor assist which aids in travel through the use of a drive assistance electric motor in addition to manual drive force are becoming more widely used (e.g., Japanese Laid-Open Patent Application No. 2001-10581). This bicycle with electric motor assist has a bicycle control apparatus, and this bicycle control apparatus determines drive assistance force for aiding in travel in accordance with the torque acting on the crank shaft, the tension on the chain, or other the manual drive force.

SUMMARY

Drive assistance force is generated in accordance with the manual drive force. Therefore, drive assistance force is not generated when a pedal is at top dead center or bottom dead center, i.e., when manual drive force is not acting on the bicycle. Accordingly, there is a problem in that the rider of the bicycle senses insufficient drive assistance force, there are periodic gaps in the drive assistance force, and riding comfort is inadequate.

An object of the present invention is to enhance the riding comfort of a bicycle having a drive assistance electric motor.

The bicycle control apparatus according to a first aspect of the present invention is a bicycle control apparatus for controlling a bicycle having a drive assistance electric motor. The bicycle control apparatus comprises a manual drive force detector, a shift state detector, and a controller. The manual drive force detector detects manual drive force. The shift state detector detects a shift state of the bicycle. The controller controls drive assistance force to be outputted by the drive assistance electric motor in accordance with the manual drive force detected by the manual drive force detector. The controller is configured to control the drive assistance force so that a reduction in the drive assistance force is delayed in relation to a reduction in the manual drive force when the manual drive force is reduced. The controller is configured to control the delay in reduction of the drive assistance force in accordance with the shift state detected by the shift state detector.

Preferably, the shift state detector detects a gear step of the bicycle as the shift state.

Preferably, the shift state detector detects a gear ratio of the bicycle as the shift state.

Preferably, the controller controls the drive assistance force so that the higher the gear ratio is, the lesser the delay in reduction of the drive assistance force is.

Preferably, when the manual drive force is reduced, the controller causes the drive assistance electric motor to output a drive assistance force equal to or greater than a base drive assistance force set in accordance with the manual drive force.

Preferably, the controller controls the delay in the reduction of the drive assistance force by correcting the drive assistance force in accordance with a time constant that corresponds to the shift state of the bicycle detected by the shift state detector.

The bicycle control apparatus according to a second aspect of the present invention is a bicycle control apparatus for controlling a bicycle having a drive assistance electric motor. The bicycle control apparatus comprises a manual drive force detector and a controller. The manual drive force detector detects manual drive force. The controller controls drive assistance force to be outputted by the drive assistance electric motor in accordance with the manual drive force detected by the manual drive force detector. The controller controls the drive assistance force so that a reduction in the drive assistance force is delayed in relation to a reduction in the manual drive force when the manual drive force is reduced. The controller controls the delay in reduction of the drive assistance force in accordance with a peak value of the manual drive force.

Preferably, the manual drive force detected by the manual drive force detector is a torque acting on a crank shaft of the bicycle.

Preferably, the controller controls the drive assistance force so that the higher the peak value is, the lesser the delay in reduction of the drive assistance force is.

Preferably, when the manual drive force is reduced, the controller causes the drive assistance electric motor to output a drive assistance force equal to or greater than a base drive assistance force set in accordance with the manual drive force.

Preferably, the controller controls the delay in the reduction of the drive assistance force by correcting the drive assistance force in accordance with a time constant that corresponds to the peak value of the manual drive force detected by the manual drive force detector.

In accordance with the present invention, the riding comfort of a bicycle having a drive assistance electric motor can be enhanced.

Also other objects, features, aspects and advantages of the disclosed bicycle control apparatus will become apparent to those skilled in the art from the following detailed description, which, taken in conjunction with the annexed drawings, discloses one embodiment of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
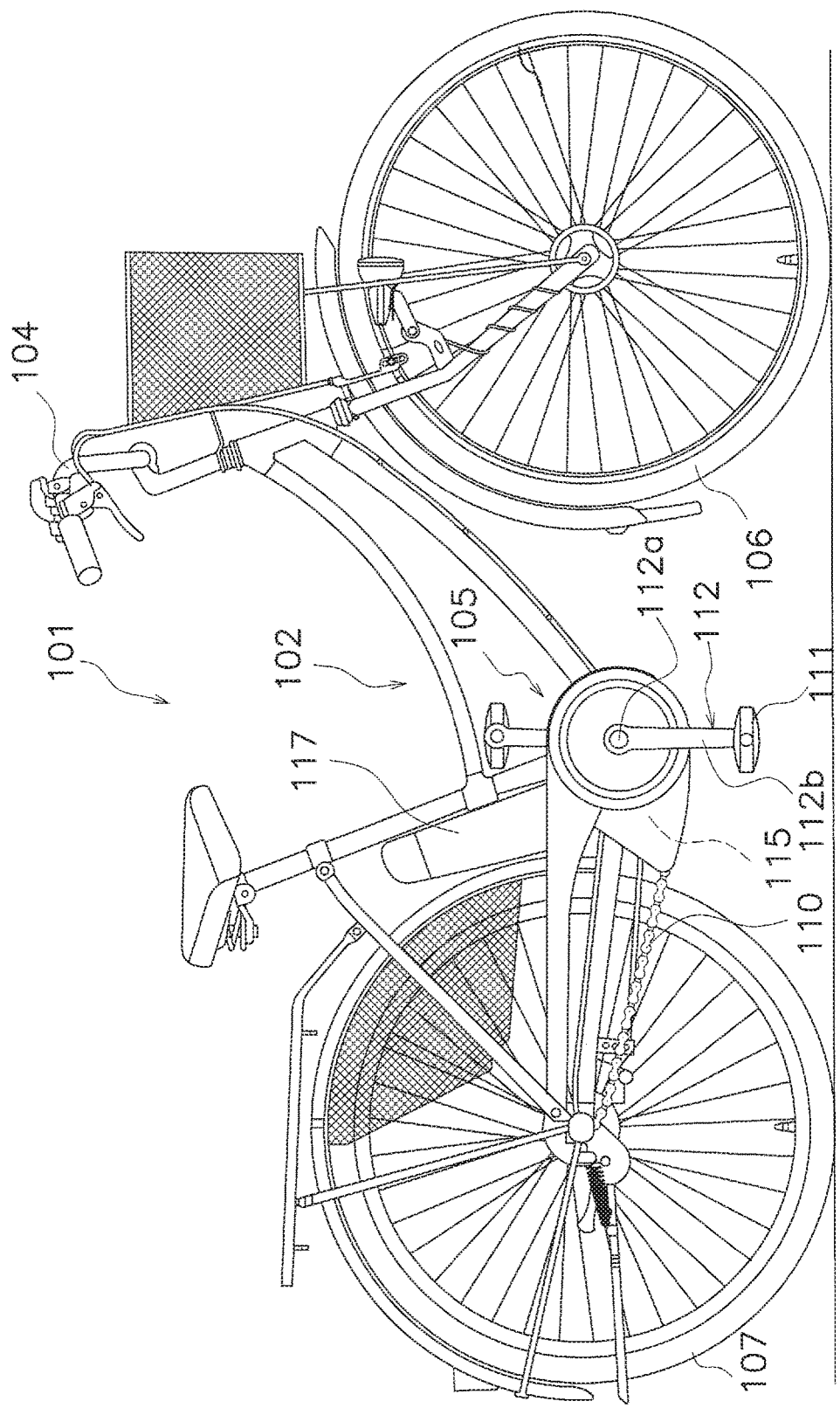
FIG. 1 is a side elevational view of a bicycle that is equipped with a bicycle control apparatus in accordance with one illustrated embodiment.

Referring initially to FIG. 1, a bicycle 101 is illustrated that is equipped with a bicycle control apparatus 1 in accordance with a first embodiment. FIG. 1 is a side elevational view of a bicycle 101. As shown in FIG. 1, in addition to the bicycle control apparatus 1, the bicycle 101 according to the first embodiment further includes a frame 102, a handle 104, a drive unit 105, a front wheel 106 and a rear wheel 107.

Figure 2:
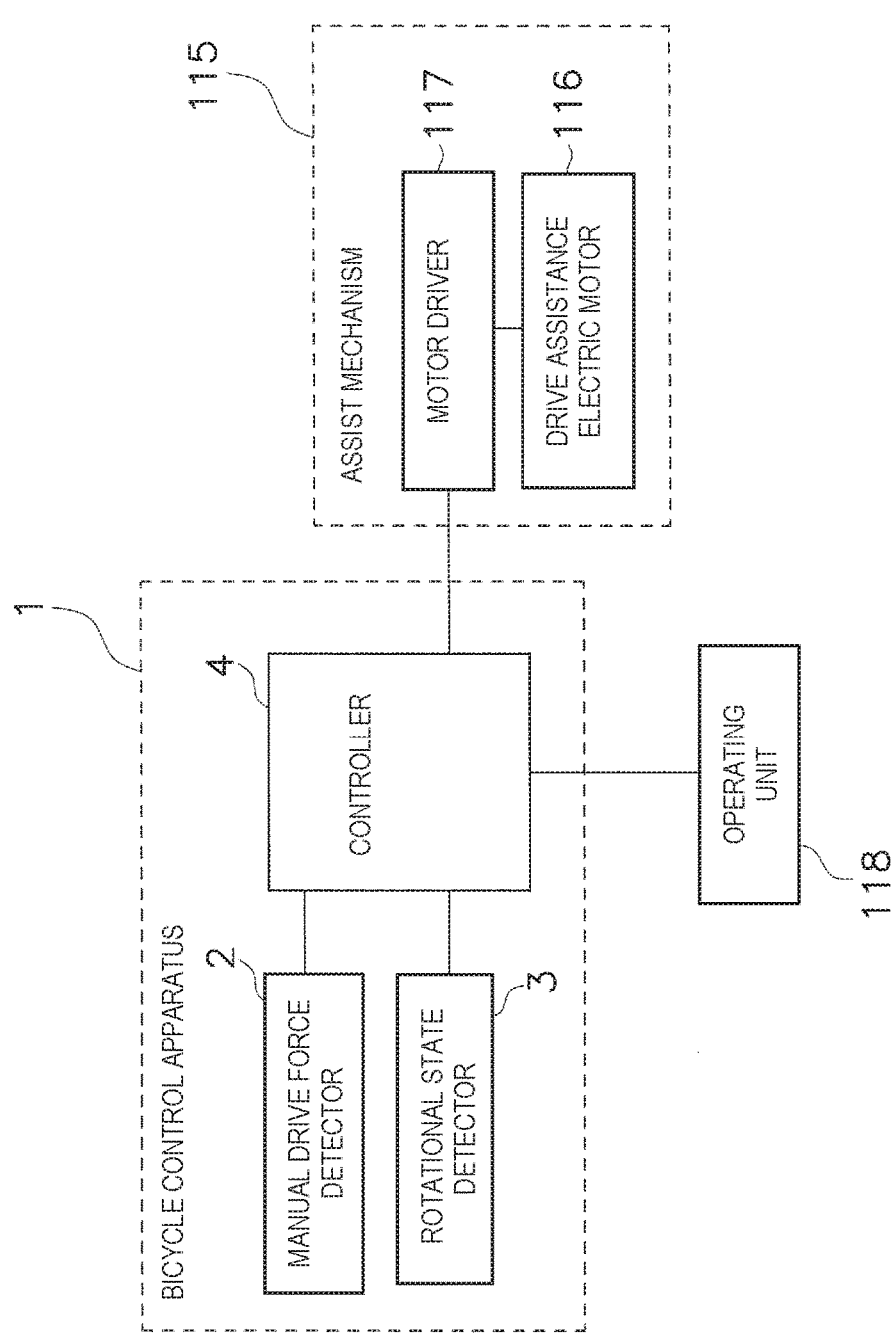
FIG. 2 is a block diagram of a configuration of a bicycle control apparatus according to a first embodiment.

The drive unit 105 has a chain 110, a pair of pedals 111, a crank 112, an assist mechanism 115 and a rechargeable battery 117. The pedals 111 are attached to the crank 112. These components are supported on the frame 102. The rechargeable battery 117 is detachable to the frame 102, and serves as a power supply for the assist mechanism 115. The crank 112 includes a crank axle 112a and a pair of crank arms 112b. The crank arms 112b are provided on opposite ends of the crank axle 112a. The drive unit 105 is furthermore provided with a front sprocket (not shown). The front sprocket is directly or indirectly connected to the crank 112. The chain 110 is wound around the front sprocket and a rear sprocket mounted on the rear wheel 107 and transmits drive force. The rechargeable battery 117 is a storage battery that uses, for example, a nickel hydride cell or a lithium ion cell and is detachably mounted to the frame 102. The rechargeable battery 117 may be mounted on a rear carrier, FIG. 2 is a block diagram that explains the bicycle control apparatus 1. As shown in FIG. 2, the bicycle control apparatus 1 has a manual drive force detector 2, a state detector 3 and a controller 4. An operating unit 118 and the assist mechanism 115 are operatively connected to the bicycle control apparatus 1.

The operating unit 118 is provided on the bicycle 101, and is mounted, for example, to the handle 104. By operating the operating unit 118, an assist condition of the assist mechanism 115 is selected. The operating unit 118 includes an operating switch. For example, by operating the operating unit 118, any one of a plurality of assist conditions can be selected, including a first assist condition, a second assist condition and a third assist condition. The assist conditions are modified to make it possible to modify the ratio of the drive assistance force in relation to the manual drive force. The details of each assist condition are described hereinafter.

The assist mechanism 115 includes a drive assistance electric motor 116 and a motor driver 117. The drive assistance electric motor 116 is controlled by the motor driver 117. The motor driver 117 controls the drive assistance electric motor 116 based on a command from the controller 4. The drive assistance electric motor 116 is coupled to a drive force transmission pathway that includes the crank shaft 112a provided between the crank arms 112b and the front sprocket. The assist mechanism 115 may be provided with a reduction gear and may be configured to transmit the output of the drive assistance electric motor 116 to the drive force transmission pathway via the reduction gear. In the present embodiment, the drive unit is configured to include the bicycle control apparatus 1 and the assist mechanism 115. The drive unit is detachably provided to the frame 102.

The manual drive force detector 2 detects the manual drive force. In other words, the manual drive force detector 2 detects the manual drive force acting on the bicycle 101. More specifically, the manual drive force detector 2 outputs a signal that corresponds to the manual drive force. For example, the manual drive force detector 2 is a torque sensor and outputs a signal (e.g., voltage) that corresponds to the torque acting on the drive force transmission pathway, which includes the crank shaft 112a of the crank 112, or the crank shaft 112a provided between the crank arms 112b and the front sprocket. The torque sensor may be, e.g., a magnetostrictive sensor or a strain gauge sensor. The manual drive force detector 2 outputs information related to the detected manual drive three to the controller 4.

The rotational state detector 3 detects the rotational state of the crank 112. More specifically, the rotational state detector 3 detects the rotation speed of the crank 112 as the rotational state. For example, the rotational state detector 3 is a cadence sensor and detects the cadence of the crank 112 as the rotation speed. The rotational state detector 3 is mounted on the frame 102 and detects a magnet mounted on the crank arm 112b. The rotational state detector 3 may be mounted on the assist mechanism 115 and may be configured so as to detect a magnet mounted on the crank shaft 112a or the drive force transmission mechanism, which includes the crank shaft 112a. The rotational state detector 3 outputs information related to the detected rotational state to the controller 4. The rotational state detector 3 may detect the rotational period of the crank 112 as the rotational state.

The controller 4 controls the drive assistance force to be outputted by the drive assistance electric motor 116, in accordance with the manual drive force detected by the manual drive three detector 2 and the rotational state of the crank 112 detected by the rotational state detector 3. The controller 4 controls the drive assistance force so that a reduction in drive assistance force is delayed in relation to a reduction in the manual drive force when the manual drive three is reduced.

More specifically, the controller 4 essentially causes a base drive assistance force set in accordance with the manual drive force to be outputted by the drive assistance electric motor 116 as drive assistance force. The controller 4 corrects the base drive assistance three when the manual drive force is reduced and causes the corrected base drive assistance force to be outputted by the drive assistance electric motor 116 as the drive assistance force. The corrected base drive assistance force is equal to or greater than the base drive assistance force prior to correction. The controller 4 makes this correction to delay a reduction in the drive assistance force in relation to a reduction in the manual drive force. Following is a description of the base drive assistance force set in accordance with the manual drive force, and change in the base drive assistance force over time.

For example, the controller 4 sets an aiding three having a magnitude of X of the manual drive force as the base drive assistance force when a first assist condition is selected by the operating unit 118. In the first assist condition, the controller 4 controls the assist mechanism 115 so that a torque having a magnitude X of the torque acting on the drive force transmission pathway by the manual drive force is imparted from the assist mechanism 115 to the drive force transmission pathway, In another example, the controller 4 sets an aiding force having a magnitude of Y of the manual drive force as the base drive assistance force when a second assist condition has been selected by the operating unit 118. In the second assist condition, the controller 4 controls the assist mechanism 115 so that a torque having a magnitude Y of the torque acting on the drive force transmission pathway by the manual drive force is imparted from the assist mechanism 115 to the drive force transmission pathway.

In yet another example, the controller 4 sets an aiding force having a magnitude of Z of the manual drive force as the base drive assistance force when a third assist condition has been selected by the operating unit 118. In the third assist condition, the controller 4 controls the assist mechanism 115 so that a torque having a magnitude Z of the torque acting on the drive force transmission pathway by the manual drive force is imparted from the assist mechanism 115 to the drive force transmission pathway. Let X, Y, and Z have the relationship X>Y >Z. For example, let X=2, Y=1.5, and Z=1. An off-mode in which assist is not provided by the assist mechanism 115 by also be selected by the operating unit 118.

Figure 3:
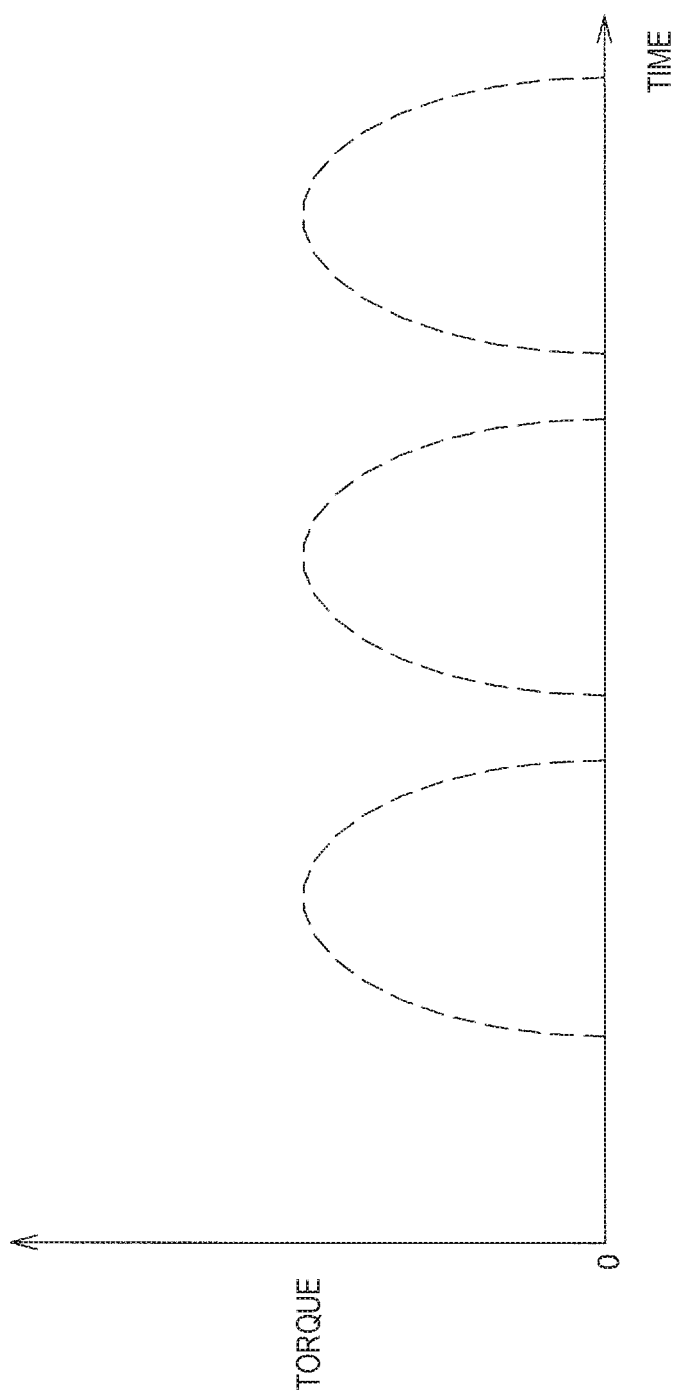
FIG. 3 is a graph showing a temporal variation in the base drive assistance force.

FIG. 3 is a graph showing temporal variation in the base drive assistance force. The manual drive force is at a minimum when the pedals 111 are positioned at top and bottom dead center, and is at a maximum when the pedals 111 are positioned in a position rotated 90° from top and bottom dead center. The base drive assistance force is set to a predetermined magnitude of the manual drive force, and the temporal variation in the base drive assistance force is a waveform such as that shown in FIG. 3.

The controller 4 causes the above-described base drive assistance force to be outputted by the drive assistance electric motor 116 as the drive assistance force, and on the other hand, corrects the base drive assistance force when the manual drive force is reduced and causes the corrected base drive assistance force to be outputted by the drive assistance electric motor 116 as the drive assistance force.

Specifically, the controller 4 converts the signal outputted by the manual drive force detector 2 into a discrete signal. In other words, the controller 4 acquires, at predetermined time intervals, information related to the manual drive force detected by the manual drive force detector 2. When the controller 4 assesses that the manual drive force detected by the manual drive force detector 2 is less than the manual drive force detected at an immediately prior time based on the discrete signal, it is assessed that the manual drive force is reduced.

Figure 4:
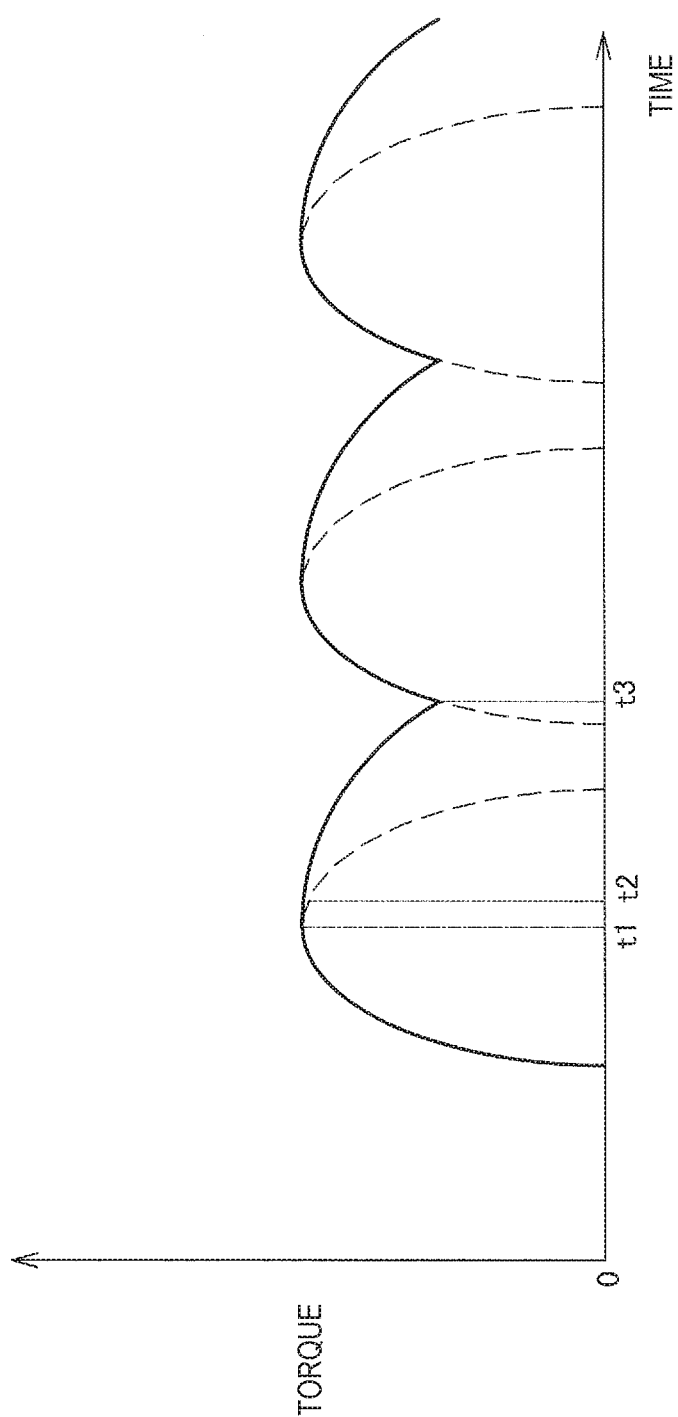
FIG. 4 is a graph showing a temporal variation in the drive assistance force.

FIG. 4 is a graph showing temporal variation in drive assistance force. In FIG. 4, the waveform shown by the solid line is the temporal variation in the drive assistance force, and the waveform shown by the broken line is the temporal variation in the base drive assistance force. As shown in FIG. 4, the controller 4 assesses that the manual drive force is reduced at time t2 following time t1. The time t1 is at time showing the base drive assistance force to be at a maximum value.

The controller 4 delays a reduction in the drive assistance force in relation to the reduction in the manual drive force when it has been assessed that the manual drive three is reduced. More specifically, the controller 4 corrects the base drive assistance force using a primary low-pass filter to obtain the drive assistance force. In this manner, the controller 4 corrects the base drive assistance force using the primary low-pass filter, whereby a reduction in the drive assistance force is delayed in relation to the reduction in the manual drive force.

The controller 4 starts correcting the base drive assistance force, and then continues correcting the base drive assistance force while the corrected base drive assistance force (drive assistance force) is greater than the base drive assistance force prior to correction. In other words, the controller 4 continues correcting the base drive assistance force from time t2 to time t3 in FIG. 4. The controller 4 stops correcting the base drive assistance force when the base drive assistance force prior to correction at time t3 is equal to or greater than the corrected base drive assistance force (drive assistance force), and causes the drive assistance electric motor 116 to output the base drive assistance force prior to correction as the drive assistance force.

The controller 4 controls the delay in reduction of the drive assistance force as described above in accordance with the rotational state of the crank 112. More specifically, in relation to a time constant of the primary low-pass filter used in the correction process, the controller 4 sets a time constant that corresponds to the rotational state of the crank 112.

More specifically, the higher the cadence of the crank 112 is, or the shorter the rotational period of the crank 112 is, the smaller the controller 4 sets the time constant to be. Also, the lower the cadence of the crank 112 is, or the longer the rotational period of the crank 112 is, the greater the controller 4 sets the time constant to be. As a result, the higher the cadence is, or the shorter the rotational period is, the shorter the delay in reduction of the drive assistance force described above will be. In other words, the higher the cadence is, or the shorter the rotational period is, the closer the drive assistance force will come to the base drive assistance force.

Figure 5:
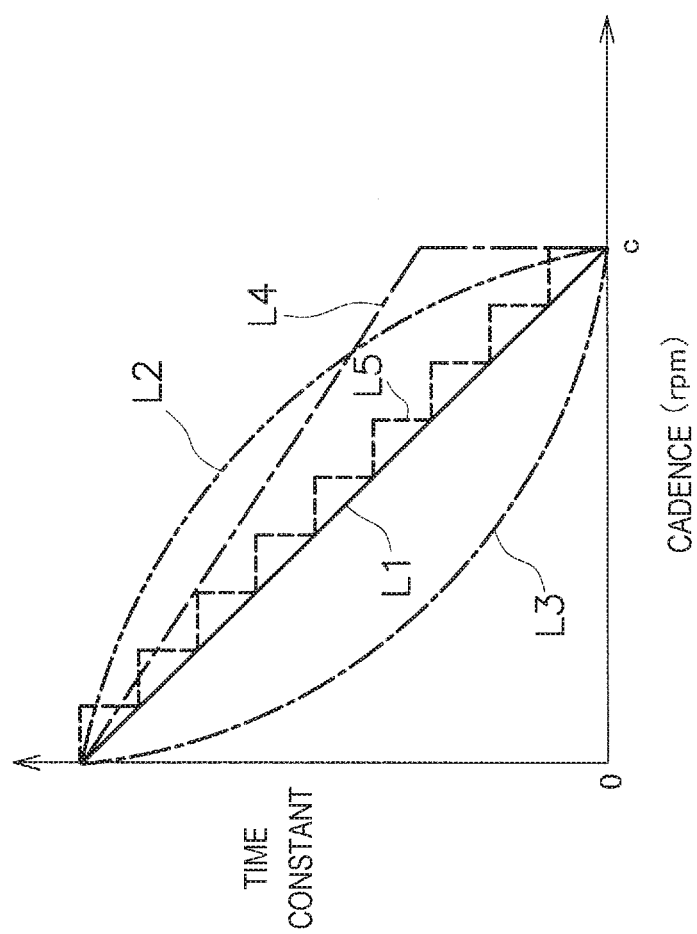
FIG. 5 is a graph showing the relationship between the time constant and the cadence.

For example, the controller 4 stores a time constant map such as that shown in FIG. 5, and sets the time constant based on the time constant map. The time constant map includes information that correlates the time constant and the cadence, and the time constant is reduced as the cadence is increased. When the cadence is a predetermined value c or higher, the time constant is correlated to be 0. In other words, the controller 4 causes the drive assistance electric motor 116 to output the base drive assistance force as the drive assistance force when the cadence is at a predetermined value c or higher. Rather than using such a time constant map, the controller 4 may calculate a time constant corresponding to the cadence using a calculation formula set in advance.

The relationship between the time constant and the cadence in the time constant map may be a relationship such as a linear function as shown by L1 in FIG. 5, or may be a relationship such an nth-order function as shown by L2 and L3 in FIG. 5. Also, the time constant may be predetermined numerical value rather than 0 when the cadence is a predetermined value c as shown by L4 in FIG. 5. The time constant map may be configured so that the time constant varies in continuous fashion in accordance with the variation in cadence, as shown by L1 to L 4 in FIG. 5, or may be configured so that the time constant varies in a stepwise discontinuous fashion in accordance with the cadence, as shown by L5 in FIG. 5. Such a time constant map is determined by experimentation. The controller 4 may furthermore be provided with a plurality of time constant maps, and the plurality of time constant maps may be configured so as to be settable by the operating unit 118.

The controller 4 is composed of, e.g., a microcomputer, and includes a central processing unit (CPU), a random access memory (RAM), a read only memory (ROM), an I/O interface, and the like.

Figure 6:
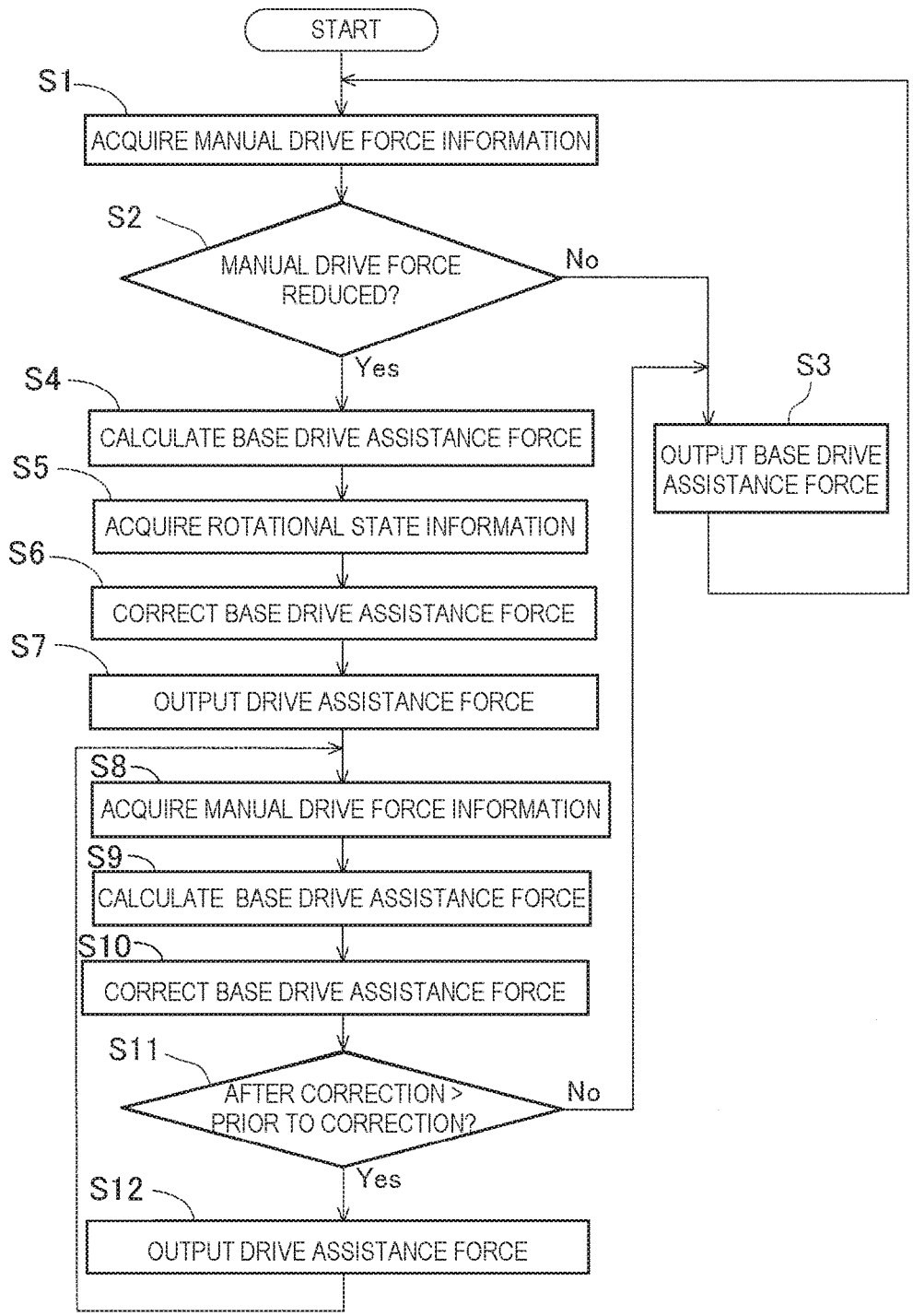
FIG. 6 is a flowchart showing a control an operation process executed by the bicycle control apparatus according to the first embodiment.

Next, the operation of the bicycle control apparatus I described above will be described with reference to FIG. 6. FIG. 6 is a flowchart for describing the operation of the bicycle control apparatus 1.

As shown in FIG. 6, the controller 4 first acquires information related to the manual drive force detected by the manual drive force detector 2 (step S1). More specifically, the controller 4 acquires information related to the torque detected by the manual drive force detector 2.

Next, the controller 4 assesses whether the manual drive force is reduced (step S2). More specifically, the controller 4 assesses whether the manual drive force thus acquired is less than the manual drive force acquired at an immediately prior time.

The controller 4 causes the drive assistance electric motor 116 to output the base drive assistance force as the drive assistance force (step S3) when it has been assessed that the manual drive force is not reduced (No in step S2). More specifically, the controller 4 causes the drive assistance electric motor 116 to output the base drive assistance force as the drive assistance force when it has been assessed that the manual drive force thus acquired is equal to or greater than the manual drive force acquired at an immediately prior time. In other words, the controller 4 calculates a base drive assistance force that corresponds to the drive assistance force and causes the drive assistance electric motor 116 to output the calculated base drive assistance force without correction.

On the other hand, the controller 4 calculates a base drive assistance force that corresponds to the manual drive force (step S4) when it has been assessed that the manual drive force is reduced (Yes in step S2). More specifically, the controller 4 calculates a base drive assistance force that corresponds to the manual drive force when it has been assessed that the manual drive force is less than the manual drive force acquired at an immediately prior time.

Next, the controller 4 acquires information related to the rotational state detected by the rotational state detector 3 (step S5). More specifically, the controller 4 acquires information related to the cadence or the rotation period detected by the rotational state detector 3.

The controller 4 subsequently corrects the base drive assistance force in accordance with the cadence or rotational period of the crank 112 (step S6). For example, the controller 4 performs a filter process using a primary low-pass filter to thereby correct the base drive assistance force. In this case, the controller 4 determines, based on the rotational state acquired in the process of step S5, the time constant to be used in the primary low-pass filter. The controller 4 has a time constant map and determines the time constant based on the time constant map. In this time constant map, the higher the cadence is or the shorter the rotational period is, the smaller the time constant is set to be.

Next, the controller 4 causes the drive assistance electric motor 116 to output the corrected base drive assistance force as the drive assistance force (step S7).

The controller 4 acquires the information related to the manual drive force detected by the manual drive force detector 2 (step S8) in the same manner as step S1.

The controller 4 calculates the base drive assistance force that corresponds to the manual drive force based on the information related manual drive force acquired in the process of step S8 (step S9). The controller 4 then corrects the base drive assistance force calculated in the process of step S9 using the same method as the process of step S6 described above (step S10).

The controller 4 assesses whether the corrected base drive assistance force is greater than the base drive assistance force prior to correction (step S11). When the controller 4 assesses that the corrected base drive assistance force is equal to or less than the base drive assistance force prior to correction (No in step S11), the process proceeds to step S3, and the drive assistance electric motor 116 is causes to output the base drive assistance force.

Conversely, when the controller 4 assesses that the corrected base drive assistance force is greater than the base drive assistance force prior to correction (Yes in step S11), the drive assistance electric motor 116 is caused to output the corrected base drive assistance force as the drive assistance force (step S12). The controller 4 thereafter proceeds to the process of step S8.

Second Embodiment

Described next is the bicycle control apparatus 1 according to a second embodiment. The bicycle 101 to which the bicycle control apparatus 1 according to the second embodiment is applied is the same as the bicycle 101 described for the first embodiment above, and a description thereof is therefore omitted. Also, the bicycle control apparatus 1 according to the second embodiment is different from the bicycle control apparatus 1 according to the first embodiment only in regard to the method for deriving the drive assistance force. The configuration is the same as that of the bicycle control apparatus 1 according to the first embodiment, and description thereof is therefore omitted.

Figure 7:
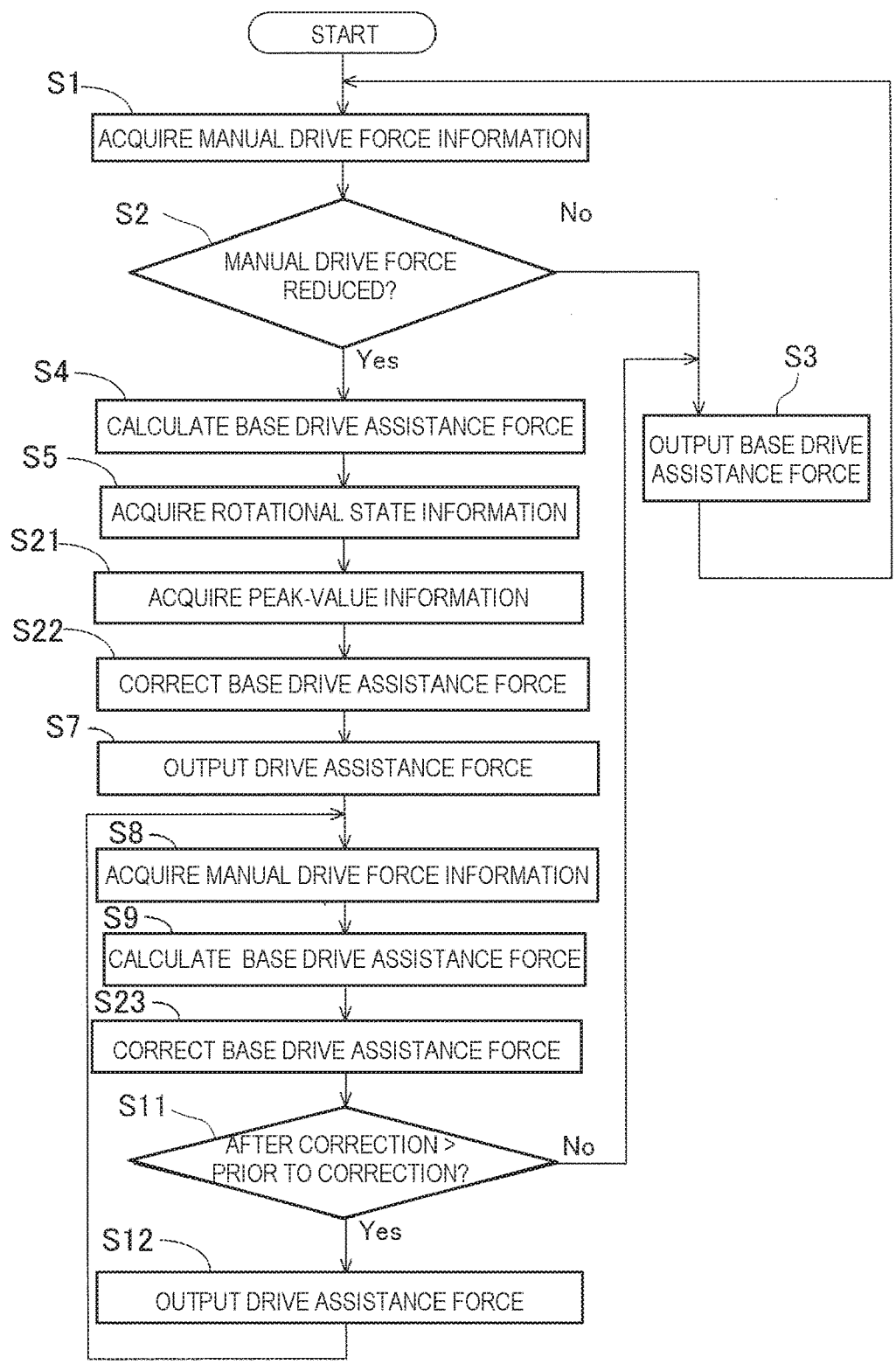
FIG. 7 is a flowchart showing a control an operation process executed by the bicycle control apparatus according to a second embodiment.

FIG. 7 is a flowchart for describing the operation of the bicycle control apparatus 1 according to the second embodiment. In FIG. 7, the processes of steps S1 to S5, S7 to S9, S11, and S12 are the same as those described in the first embodiment above, and a detailed description thereof is therefore omitted.

Following the process in step S5, the controller 4 acquires information related to the peak value of the manual drive force detected by the manual drive force detector 2 (step S21).

Next, the controller 4 corrects the base drive assistance force in accordance with the rotational state of the crank 112 and the peak value of the manual drive force (step S22). More specifically, the controller 4 corrects the base drive assistance force in accordance with the cadence or rotational period of the crank 112 and the peak value of the torque acting on the crank shaft 112*a*.

For example, the controller 4 performs a filter process using a primary low-pass filter to thereby correct the base drive assistance force. In this case, the controller 4 determines a time constant to be used in the primary low-pass filter, based on the cadence or rotational period of the crank 112 and the peak value of the torque acting on the crank shaft 112*a*. The controller 4 determines the time constant so that the higher the cadence is or the shorter the rotational period is, the smaller the time constant is. Also, the controller 4 determines the time constant so that the greater the peak value is, the smaller the time constant is.

For example, the controller 4 has a first time constant map and a second time constant map. The first time constant map includes information in which the cadence of the crank 112 and the first time constant have been correlated. The second time constant map includes information in which the peak value of the torque acting on the crank shaft 112*a* and the time constant have been correlated.

The controller 4 determines the first time constant corresponding to the cadence of the crank 112 with reference to the first time constant map. Also, the controller 4 determines the second time constant corresponding to the peak value of the torque acting on the crank shaft 112*a* with reference to the second time constant map. The controller 4 calculates the time constant to be used in the primary low-pass filter, based on the first time constant and the second time constant. For example, the controller 4 multiplies the first time constant and the second time constant to calculate the time constant to be used in the primary low-pass filter. In this case, the higher the cadence is, the smaller the first time constant is in the first time constant map, and the greater the peak value is, the smaller the time constant is in the second time constant map.

After the process in step S22 has been executed, the controller 4 executes steps S7 to S9 in the same manner as in the first embodiment above, and thereafter corrects the base drive assistance force calculated in the process of step S9 using the same process as in step S22 above (step S23).

Third Embodiment

Described next is the control apparatus 1*a* for a bicycle according to a third embodiment. The bicycle 101 to which the control apparatus 1*a* for a bicycle according to the third embodiment is applied is the same as the bicycle 101 described for the first embodiment above, and a description thereof is therefore omitted.

Figure 8:
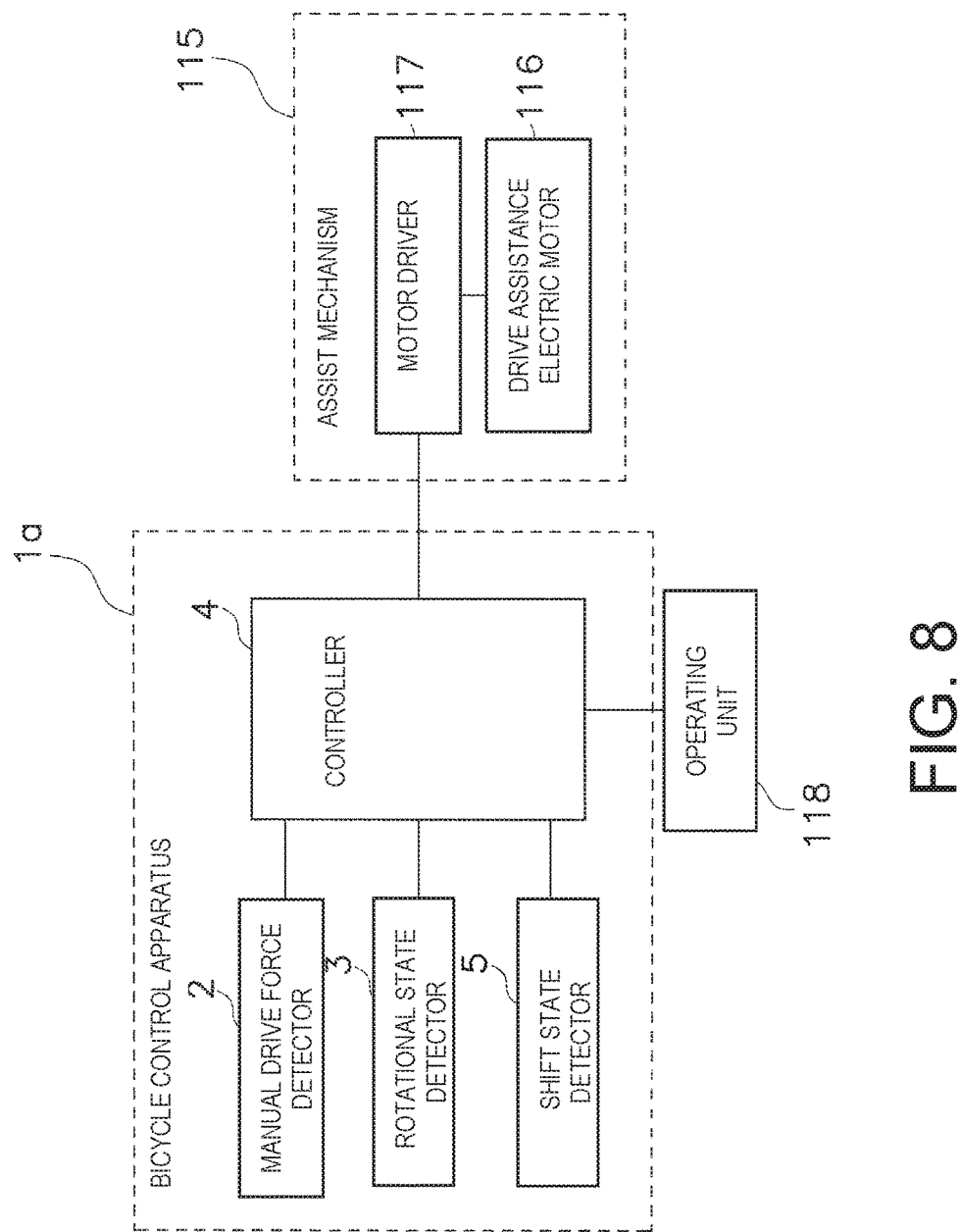
FIG. 8 is a block diagram of a configuration of a bicycle control apparatus according to a third embodiment.

FIG. 8 is a block view showing a configuration of the control apparatus la for a bicycle according to a third embodiment. As shown in FIG. 8, the control apparatus la for a bicycle according to the third embodiment is provided with a manual drive force detector 2, a rotational state detector 3, a controller 4, and a shift state detector 5. The manual drive force detector 2, the rotational state detector 3, and the controller 4 are essentially the same as those described in the first embodiment above, and a detailed description is therefore omitted.

The shift state detector 5 detects the shift state of the bicycle 101. More specifically, the shift state detector 5 detects a gear step or gear ratio of the bicycle 101 as the shift state of the bicycle 101. Specifically, the shift state detector 5 is a sensor for detecting the position of the shifter of the bicycle 101.

Figure 9:
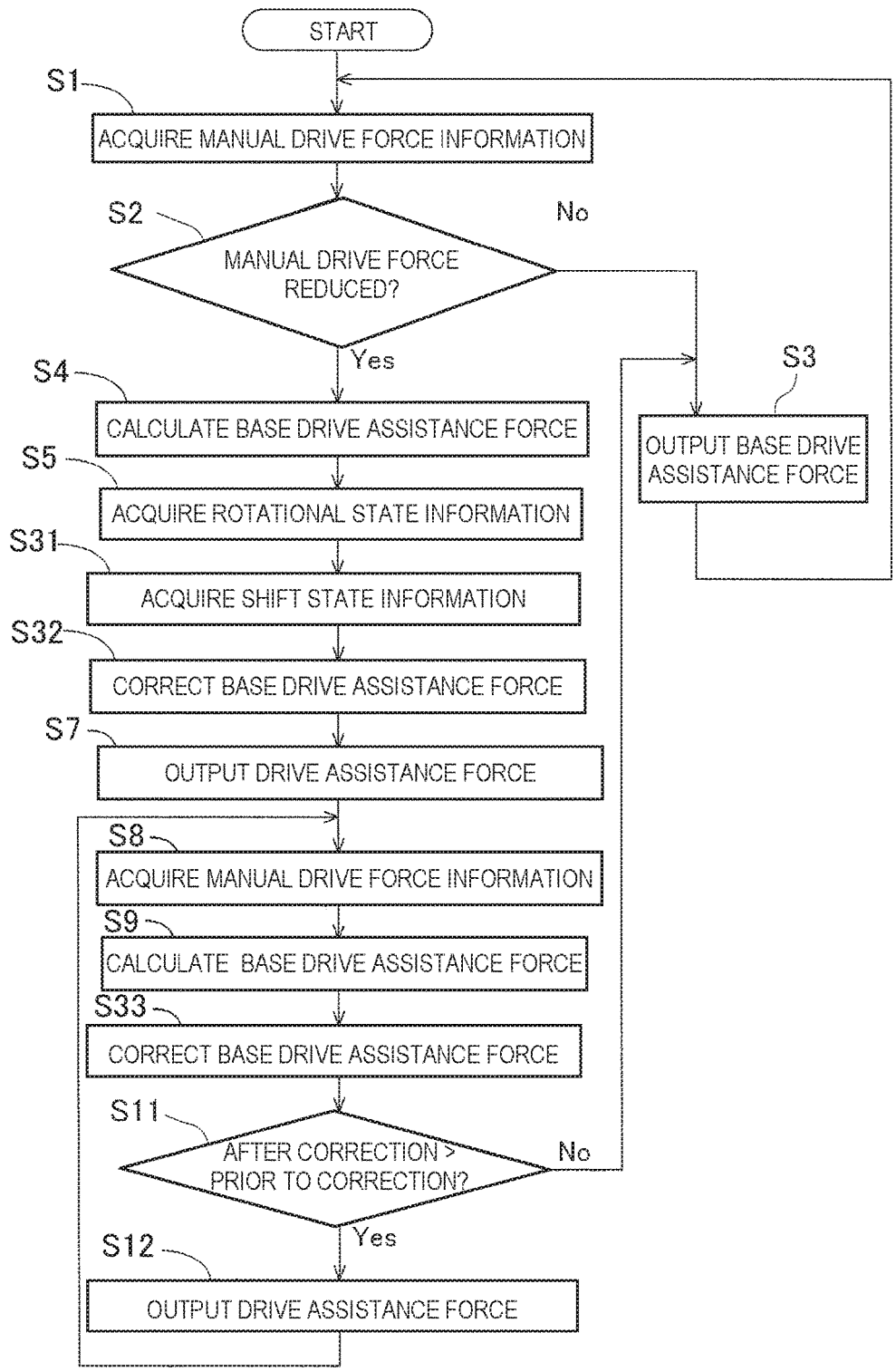
FIG. 9 is a flowchart showing a control an operation process executed by the bicycle control apparatus according to the third embodiment.

FIG. 9 is a flowchart for describing the operation of the control apparatus la for a bicycle according to the third embodiment. In FIG. 9, the processes of steps S1 to S5, S7 to S9, S11, and S12 are the same as those described in the first embodiment above, and a detailed description thereof is therefore omitted.

Following the process in step S5, the controller 4 acquires information related to the shift state of the bicycle 101 detected by the shift state detector 5 (step S31). Specifically, the controller 4 acquires information related to the gear step or gear ratio.

Next, the controller 4 corrects the base drive assistance force in accordance with the cadence or rotational period of the crank 112 and the gear ratio (step S32). For example, the controller 4 corrects the base drive assistance force by performing a filter process using a primary low-pass filter. In this case, the controller 4 determines the time constant to be used in the primary low-pass filter, based on the cadence or rotational period of the crank 112 and the gear ratio. The controller 4 determines the time constant so that the higher the cadence is or the shorter the rotational period is, the smaller the time constant is. Also, the controller 4 determines the time constant so that the greater the gear ratio is, the smaller the time constant is.

For example, the controller 4 has a first time constant map and a third time constant map. The first time constant map includes information in which the cadence of the crank 112 and the first time constant have been correlated. The third time constant map includes information in which the gear ratio and the third time constant have been correlated.

The controller 4 determines the first time constant corresponding to the cadence of the crank 112 with reference to the first time constant map. The controller 4 also determines the third time constant corresponding to the gear ratio with reference to the third time constant map. The controller 4 then calculates the time constant to be used in the primary low-pass filter, based on the first time constant and the third time constant. For example, the controller 4 multiplies the first time constant and the third time constant to calculate the time constant to be used in the primary low-pass filter. In this case, the higher the cadence is, the smaller the first time constant is in the first time constant map, and the greater the gear ratio is, the smaller the time constant is in the third time constant map.

The controller 4 executes the process in step S32, then executes the process in steps S7 to S9 in the same manner as the first embodiment above, and thereafter corrects the base drive assistance force calculated in the process of step S9 using the same method as the process of step S32 described above (step S33).

Fourth Embodiment

Described next is a control apparatus 1*b* for a bicycle according to a fourth embodiment. The bicycle 101 to which the control apparatus 1*b* for a bicycle according to the fourth embodiment is applied is the same as the bicycle 101 described for the first embodiment above, and a description thereof is therefore omitted.

Figure 10:
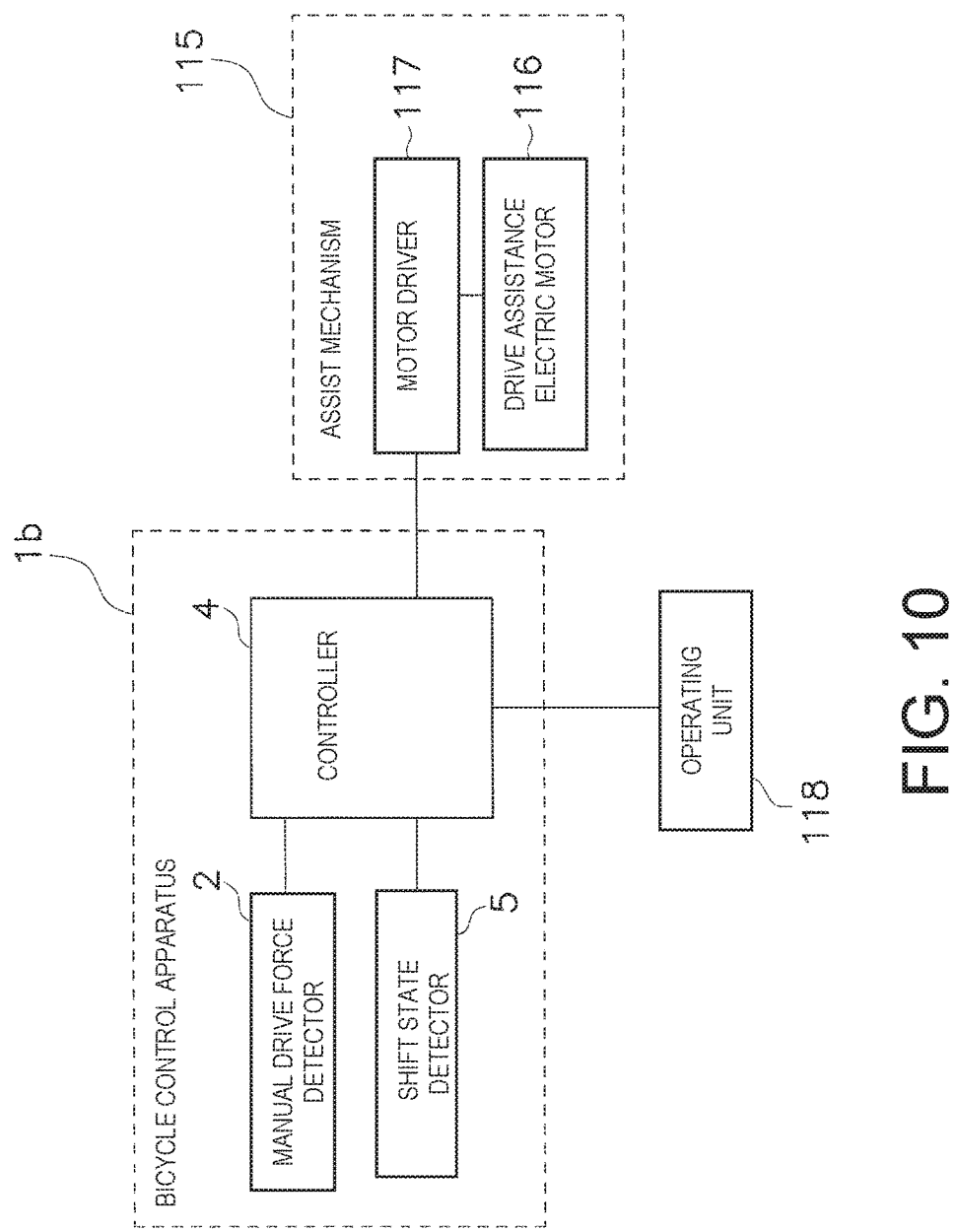
FIG. 10 is a block diagram of a configuration of a bicycle control apparatus according to a fourth embodiment.

FIG. 10 is a block view showing a configuration of the control apparatus 1*b* for a bicycle according to the fourth embodiment. As shown in FIG. 10, the control apparatus 1*b* for a bicycle according to the fourth embodiment is provided with a manual drive force detector 2, a controller 4, and a shift state detector 5. The manual drive force detector 2 and the controller 4 are essentially the same as those described in the first embodiment above, and a detailed description is therefore omitted. The shift state detector 5 is the same as that described in the third embodiment, and a detailed description is therefore omitted.

Figure 11:
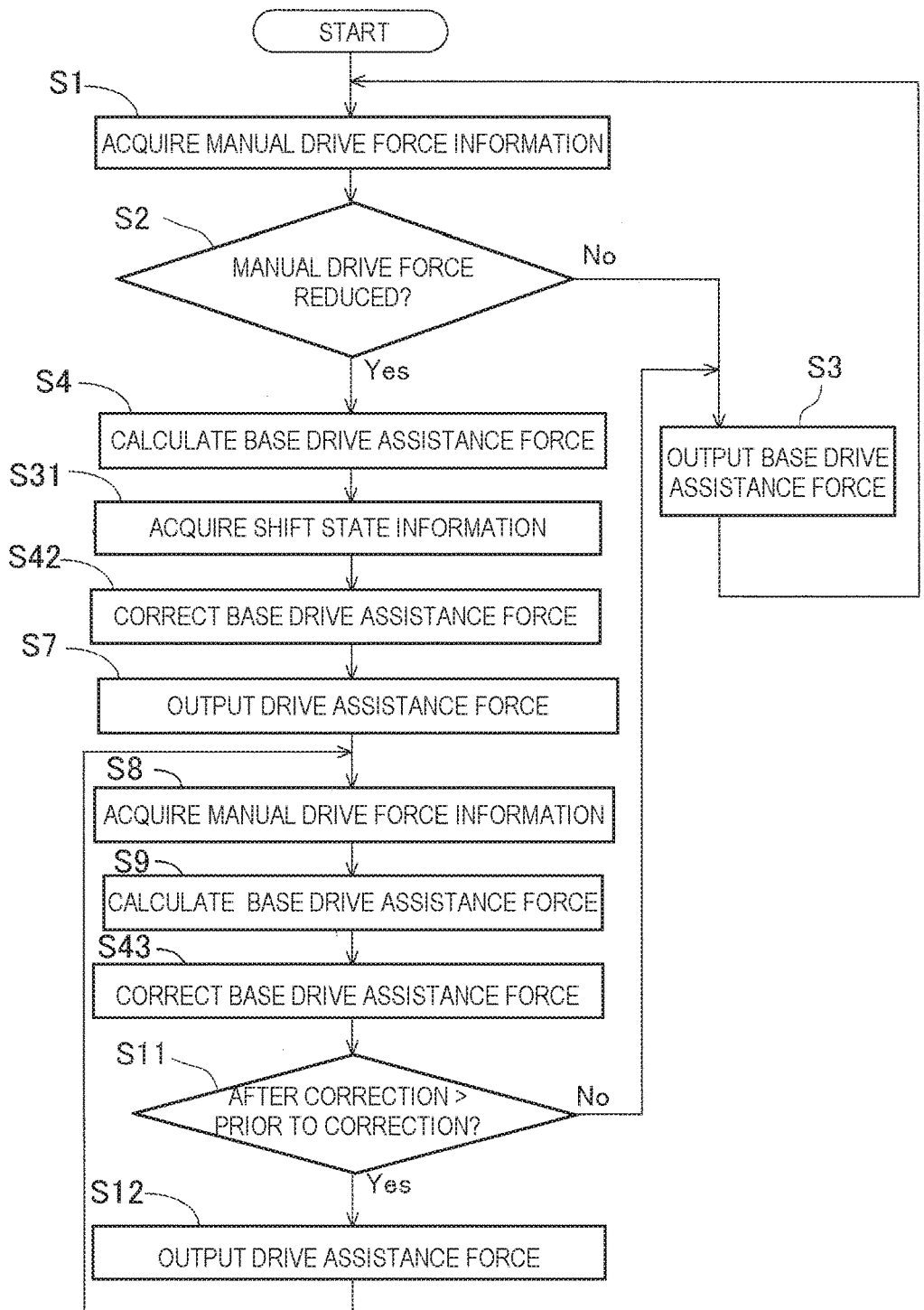
FIG. 11 is a flowchart showing a control an operation process executed by the bicycle control apparatus according to the fourth embodiment.

FIG. 11 is a flowchart for describing the operation of the control apparatus 1b for a bicycle according to the fourth embodiment. The operation in the control apparatus 1b for a bicycle is the same as the processes described in the third embodiment above, except that the rotation speed of the crank 112 is not detected. Therefore, a detailed description of the processes described in the third embodiment will be omitted.

In other words, following the process in step S4, the controller 4 acquires only information related to the gear step or the gear ratio (step S31). Next, the controller 4 corrects the base drive assistance force in accordance with the gear ratio (step S42). For example, the controller 4 performs a filter process using a primary low-pass filter to thereby correct the base drive assistance force. In this case, the controller 4 determines the time constant to be used in the primary low-pass filter, based on the gear ratio. The controller 4 determines the time constant so that the higher the gear ratio is, the smaller the time constant is.

The controller 4 corrects the base drive assistance force calculated in the process of step S9 using the same method as the process in step S42 (step S43).

Fifth Embodiment

Described next is a control apparatus 1c for a bicycle according to a fifth embodiment. The bicycle 101 to which the control apparatus 1c for a bicycle according to the fifth embodiment is applied is the same as the bicycle 101 described in the first embodiment above, and a description thereof is therefore omitted.

Figure 12:
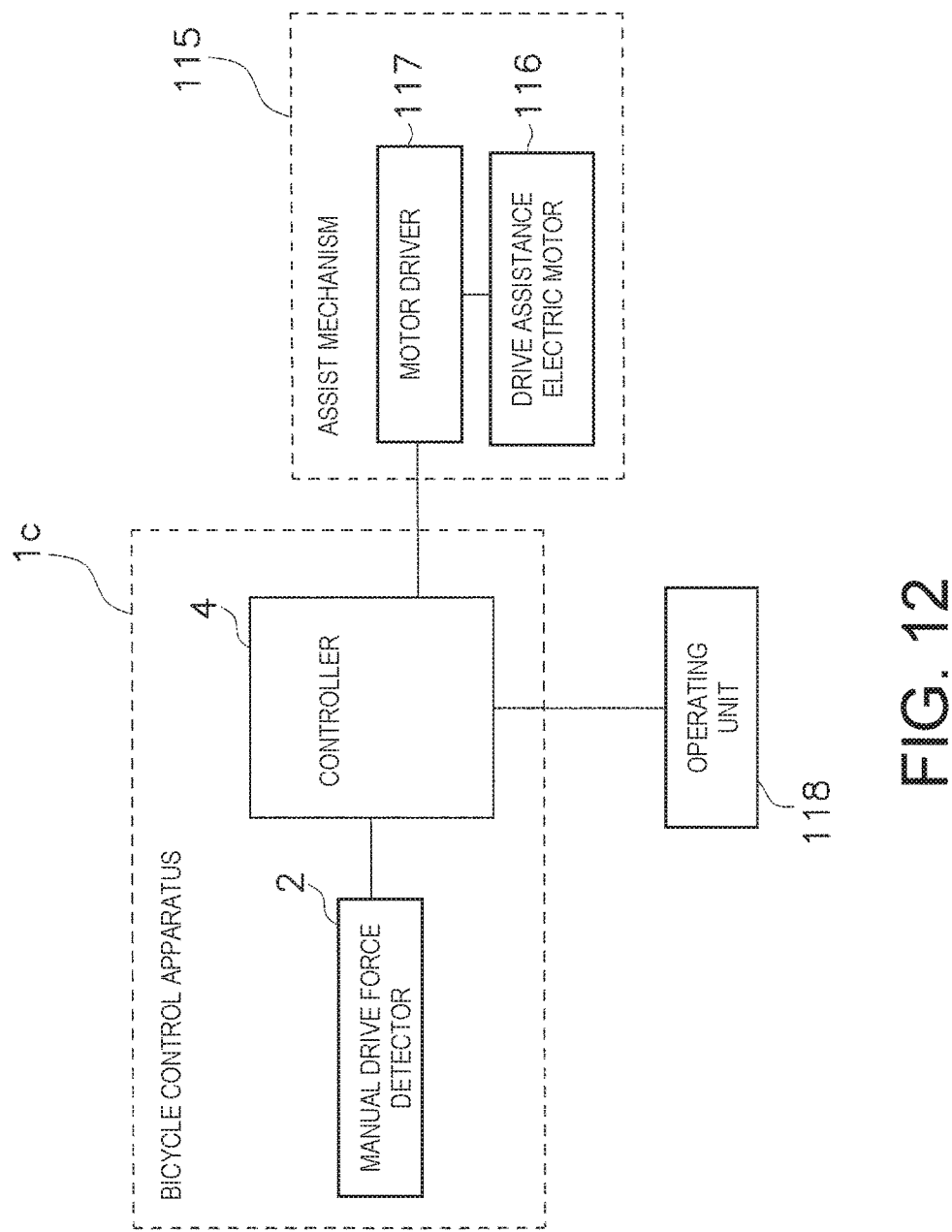
FIG. 12 is a block diagram of a configuration of a bicycle control apparatus according to a fifth embodiment.

FIG. 12 is a block view showing the configuration of the control apparatus 1c for a bicycle according to the fifth embodiment. As shown in FIG. 12, the control apparatus 1c for a bicycle according to the fifth embodiment is provided with a manual drive force detector 2 and a controller 4. The manual drive force detector 2 and the controller 4 are the same as those described in the first embodiment above, and a detailed description is therefore omitted.

Figure 13:
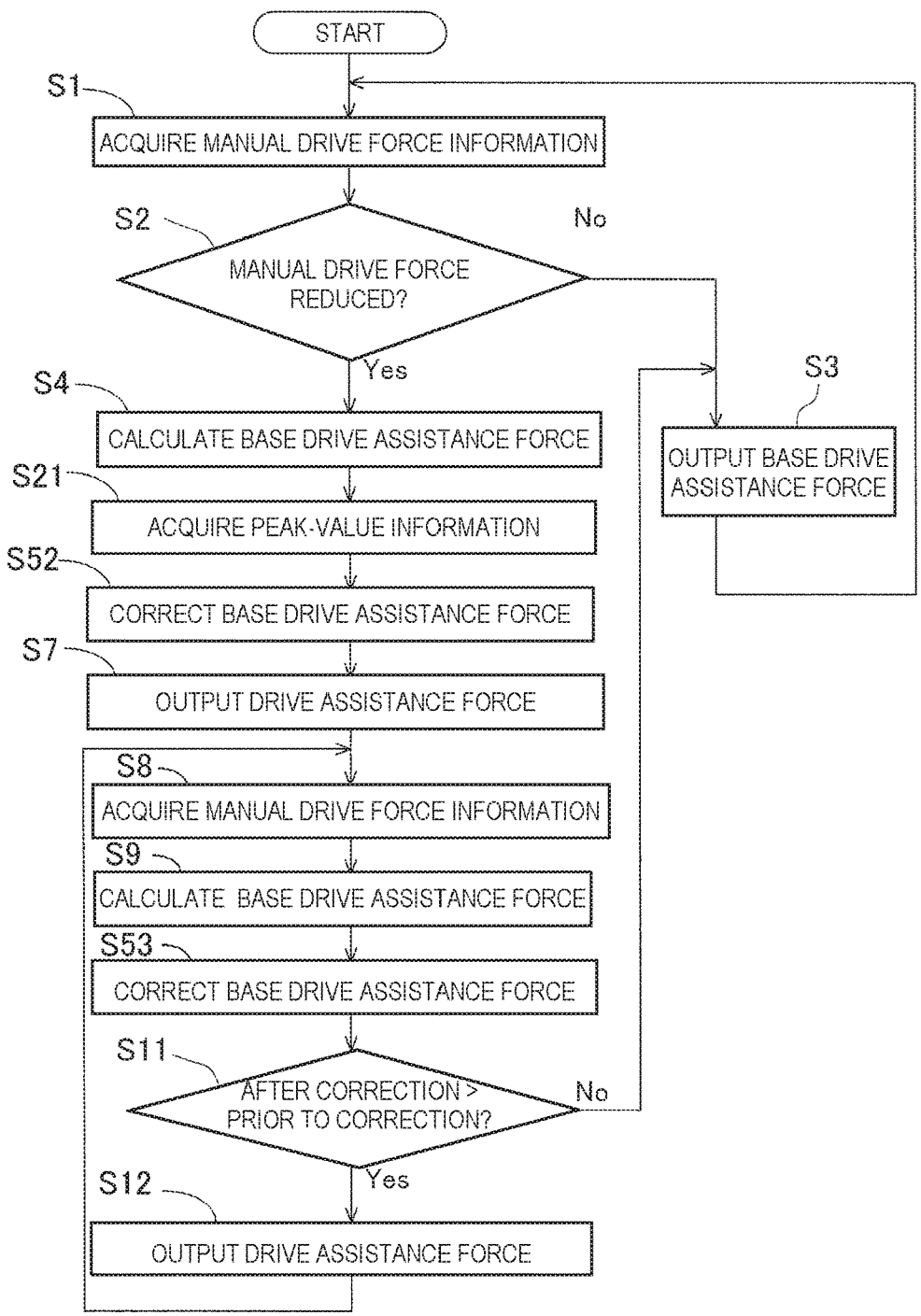
FIG. 13 is a flowchart showing a control an operation process executed by the bicycle control apparatus according to the fifth embodiment.

FIG. 13 is a flowchart for describing the operation of the control apparatus for a bicycle according to the fifth embodiment. The operation in the control apparatus 1c for a bicycle is the same as the processes described in the second embodiment above, except that the cadence of the crank 112 is not detected. Therefore, a detailed description of the processes described in the second embodiment will be omitted.

In other words, following the process in step S4, the controller 4 acquires only information related to the peak value of the manual drive three (step S21). Next, the controller 4 corrects the base drive assistance force in accordance with the peak value of the manual drive force detected by the manual drive force detector 2 (step S52). For example, the controller 4 performs a filter process using a primary low-pass filter to thereby correct the base drive assistance force. In this case, the controller 4 determines the time constant to be used in the primary low-pass filter, based on the peak value of the manual drive force. The controller 4 determines the time constant so that the greater the peak value is, the smaller the time constant is.

The controller 4 then corrects the base drive assistance force calculated in the process of step S9 using the same method as the process of step S52 described above (step S53).

Modifications

Embodiments of the present invention were described above, but the present invention is not limited thereto, and various modifications are possible within a range that does not depart from the spirit of the invention.

First Modification

Figure 14:
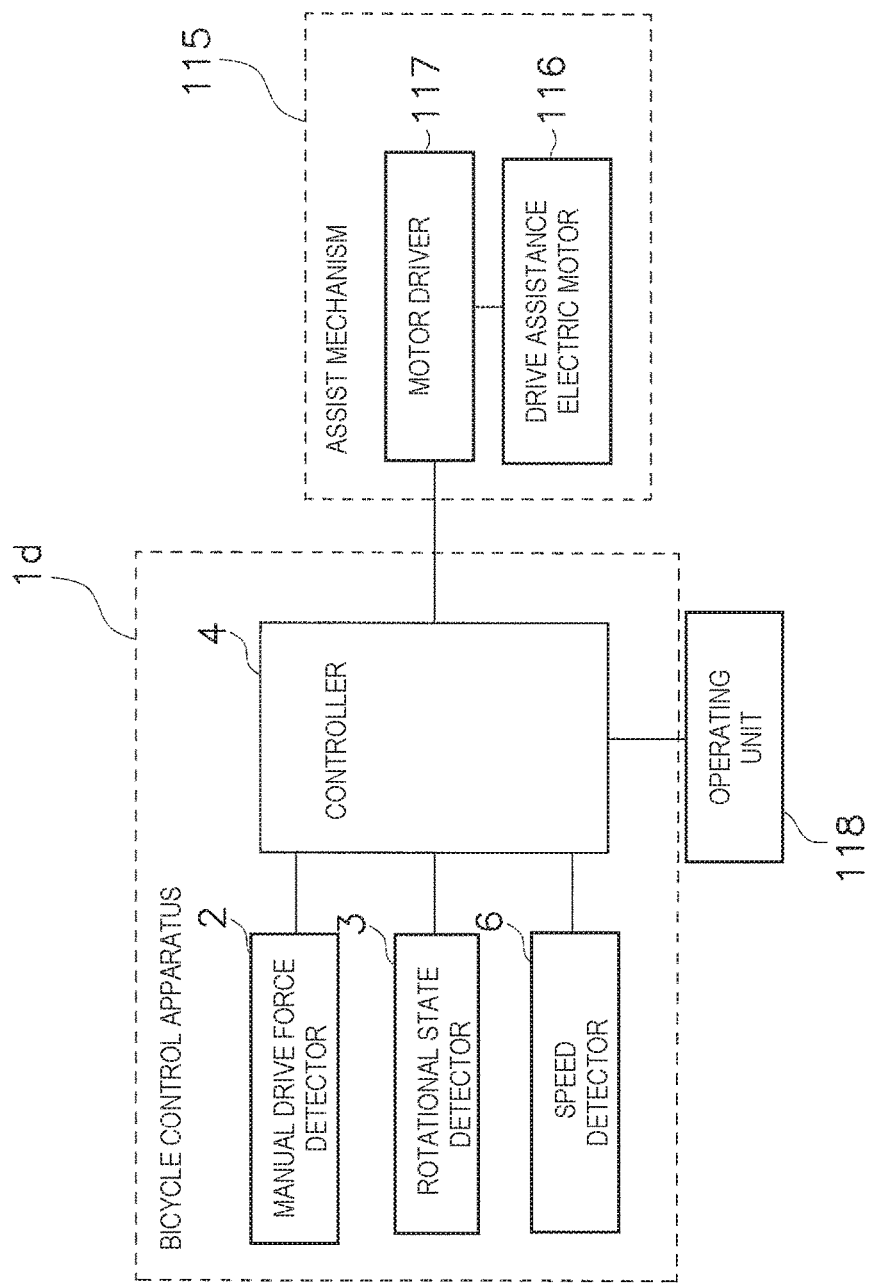
FIG. 14 is a block diagram of a configuration of a bicycle control apparatus according to a first modification.

In the third and fourth embodiments, a shift state detector 5 is provided and the shift state of the bicycle 101 is detected by the shift state detector 5, but no limitation is imposed thereby. For example, a control apparatus 1d for a bicycle is provided with a speed detector 6 in lieu of the shift state detector 5, as shown in FIG. 14. The speed detector 6 is, e.g., a speed sensor.

The controller 4 may calculate the gear ratio based on the speed detected by the speed detector 6 and the rotation speed detected by the rotational state detector 3. In this case, the rotational state detector 3 and the speed detector 6 constitute the rotational state detector.

Second Modification

Figure 15:
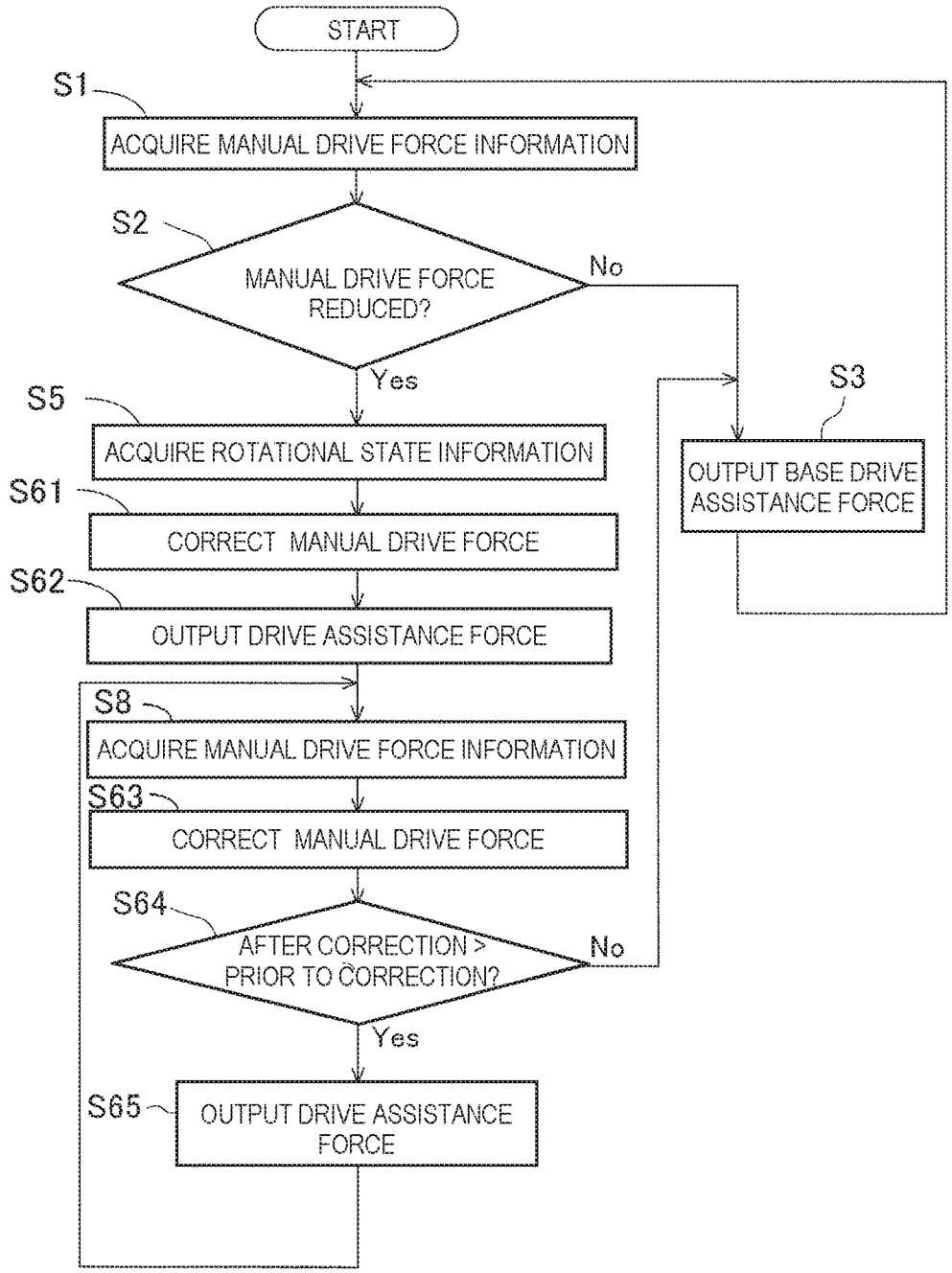
FIG. 15 is a flowchart showing a control operation process executed by the bicycle control apparatus according to a second modification.

In the embodiments described above, the controller 4 corrects the base drive assistance force when it has been assessed that the manual drive force is reduced, but no limitation is imposed thereby. For example, the controller 4 may correct the manual drive force detected by the manual drive force detector 2 in lieu of correcting the base drive assistance force. In other words, rather than directly correcting the base drive assistance force in modification 2, the controller 4 corrects the manual drive force to thereby indirectly correct the base drive assistance force, The operation of the bicycle control apparatus 1 is described below for the case in which modification 2 is applied to the first embodiment. FIG. 15 is a flowchart for describing the operation of the bicycle control apparatus 1 according to modification 2. A description is omitted for the processes that are the same as those in the first embodiment.

As shown in FIG. 15, the controller 4 first executes the processes of step S1 and step S2. The controller 4 then executes step S3 when it is assessed that the manual drive force is not reduced (No in step S2).

Conversely, the controller 4 executes step S5 when it has been assessed that the manual drive force is reduced (Yes in step S2). The controller 4 then corrects the manual drive force acquired in the process of step S1 in accordance with the cadence or rotational period of the crank 112 (step S61). For example, the controller 4 performs a filter process using a primary low-pass filter to thereby correct the manual drive force. In this case, the controller 4 determines the time constant to be used in the primary low-pass filter, based on the rotational state acquired in the process of step S5. The controller 4 has a time constant map and determines the time constant based on the time constant map. In this time constant map, the higher the cadence is or the shorter the rotational period is, the smaller the time constant is set to be.

Next, the controller 4 calculates the drive assistance force that corresponds to the corrected manual drive force, and causes the drive assistance electric motor 116 to output the calculated drive assistance force (step S62). As a result, a reduction in the drive assistance force is delayed in relation to a reduction in the manual drive force prior to correction.

The controller 4 subsequently executes the process of step S8. The controller 4 then corrects the manual drive force acquired in the process of step S8 in the same manner as the process in step S61 above (step S63).

Next, the controller 4 assesses whether the corrected manual drive force is greater than the manual drive force prior to correction (step S64). The controller 4 proceeds to the process of step S3 when the corrected manual drive force has been assessed to be equal to or less than the manual drive force prior to correction (No in step S64), and causes the drive assistance electric motor 116 to output the base drive assistance force. In other words, the controller 4 calculates the base drive assistance force that corresponds to the manual drive force prior to correction. The controller 4 then causes the drive assistance electric motor 116 to output the calculated base drive assistance three as the drive assistance force.

Conversely, the controller 4 calculates the drive assistance force that corresponds to the corrected manual drive force when it has been assessed that the corrected manual drive force is greater than the manual drive force prior to correction (Yes in step S64), and causes the drive assistance electric motor 116 to output the calculated drive assistance force (step S65).

The second modification can be applied to other embodiments with the same approach.

In the embodiments and modifications described above, power consumption can be suppressed, the riding comfort of a bicycle having a drive assistance electric motor can be enhanced, and battery power consumption can be suppressed in comparison with when the time constant in the filter is fixed.

Thus, the foregoing descriptions of the embodiments according to the present invention are provided for illustration only, and not for the purpose of limiting the invention as defined by the appended claims and their equivalents.

What is claimed is:

1. A bicycle control apparatus for controlling a bicycle having a drive assistance electric motor, the bicycle controller comprising:
    a manual drive force detector configured to detect a manual drive force;
    a shift state detector configured to detect a shift state of the bicycle; and.
    a controller programmed to issue a command for controlling a drive assistance force to be outputted by the drive assistance electric motor in accordance with the manual drive force detected by the manual drive force detector,
    the controller being configured to
        control the drive assistance force so as to delay a reduction in the drive assistance force in relation to a reduction in the manual drive force upon determining the manual drive force is reduced, and
        control the delay in the reduction of the drive assistance force in accordance with the shift state detected by the shift state detector.

2. The bicycle control apparatus according to claim 1, wherein
    the shift state detector detects a gear step of the bicycle as the shift state.

3. The bicycle control apparatus according to claim 1, wherein
    the shift state detector detects a gear ratio of the bicycle as the shift state.

4. The bicycle control apparatus according to claim 3, wherein
    the controller controls the drive assistance force so that as the gear ratio becomes higher, the delay in the reduction of the drive assistance force is lessened.

5. The bicycle control apparatus according to claim 1, wherein
    the controller controls the drive assistance electric motor to output the drive assistance force equal to or greater than a base drive assistance force set in accordance with the manual drive force upon determining the manual drive force is reduced.

6. The bicycle control apparatus according to claim 1, wherein
    the controller controls the delay in the reduction of the drive assistance force by correcting the drive assistance force in accordance with a time constant that corresponds to the shift state of the bicycle detected by the shift state detector.

7. A bicycle control apparatus for controlling a bicycle having a drive assistance electric motor, the bicycle controller comprising:
    a manual drive force detector for detecting a manual drive force; and
    a controller programmed to issue a command for controlling a drive assistance force to be outputted by the drive assistance electric motor in accordance with the manual drive force detected by the manual drive force detector,
    the controller controlling the drive assistance force so as to delay a reduction in the drive assistance force in relation to a reduction in the manual drive force upon determining the manual drive force is reduced, and controlling, the delay in the reduction of the drive assistance force in accordance with a peak value of the manual drive force.

8. The bicycle control apparatus according to claim 7, wherein
    the manual drive force detected by the manual drive force detector is a torque acting on a crank shaft of the bicycle.

9. The bicycle control apparatus according to claim 7, wherein
    the controller controls the drive assistance force so that as the peak value becomes higher, the delay in the reduction of the drive assistance force is lessened.

10. The bicycle control apparatus according to claim 7, wherein
    the controller controls the drive assistance electric motor to output the drive assistance force equal to or greater than a base drive assistance force set in accordance with the manual drive force upon determining the manual drive force is reduced.

11. The bicycle control apparatus according to claim 7, wherein
    the controller controls the delay in the reduction of the drive assistance force by correcting the drive assistance force in accordance with a time constant that corresponds to the peak value of the manual drive force detected by the manual drive force detector.

* * * * *